Patented July 4, 1939

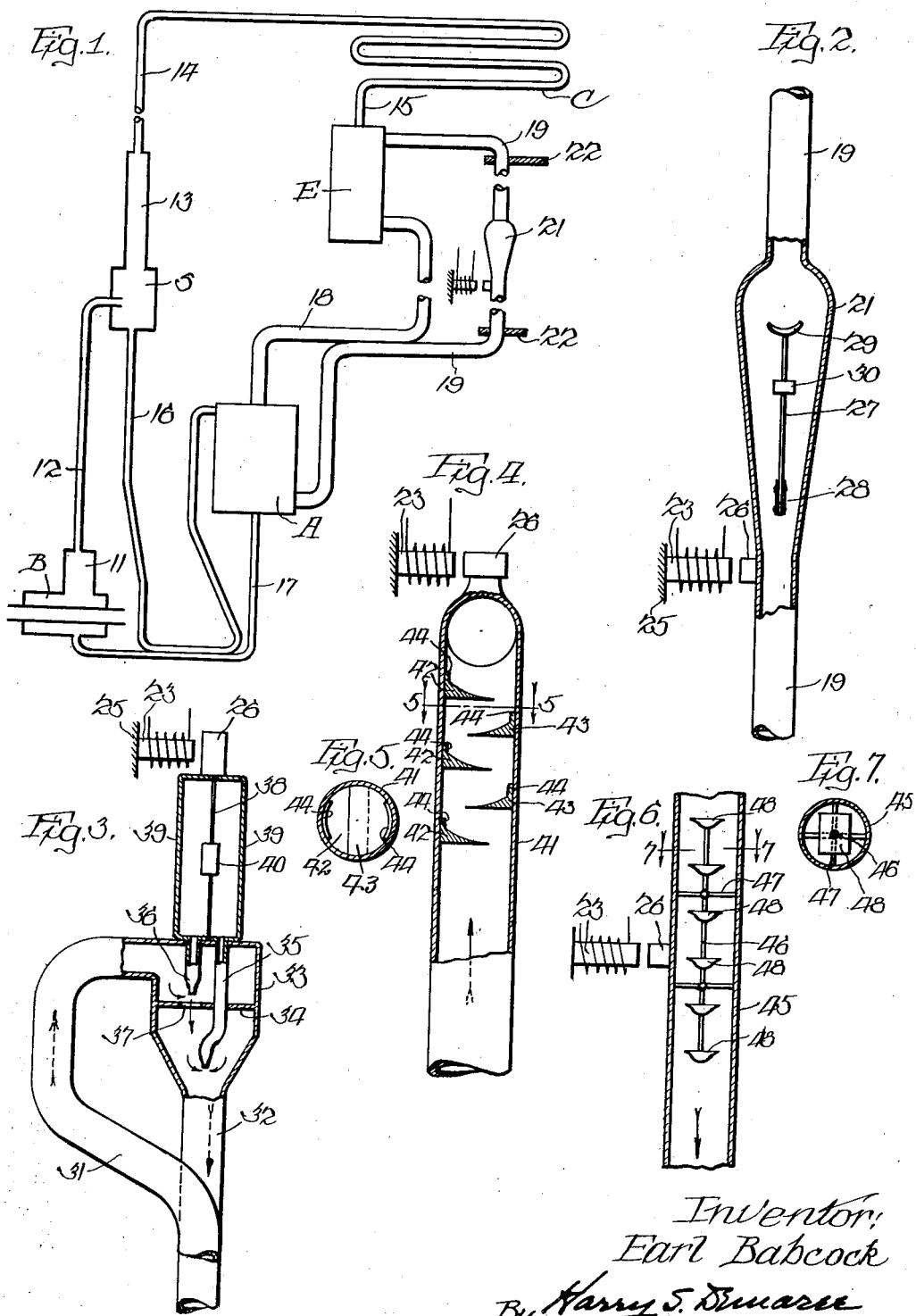

2,164,863

UNITED STATES PATENT OFFICE 2,164,863

FLUID CIRCULATOR

Earl Babcock, Evanston, Ill., assignor to The Hoover Company, North Canton, Ohio, a corporation of Ohio Application October 10, 1935, Serial No. 44,368

23 Claims. (Cl. 62—119.5)

This invention relates to hermetically sealed systems such as continuous absorption refrigerating systems, and more particularly to means for circulating a fluid in such a system.

One of the problems encountered in the operation of absorption refrigeration machines is the circulation of the inert gas or pressure equalizing medium between the evaporator and absorber vessels at the desired rate and in the desired direction. Previously it has been proposed to circulate the gas by gravity due to the difference in the specific gravity of two columns of the gas. This method is objectionable for several reasons. For example, circulation is not positive and is likely to start in either direction after which it will continue to flow in that direction. Moreover, very little resistance to the flow of the gas can be interposed in the gas circuit or the gas will fail to circulate. There are accordingly many limitations imposed upon the designer, and even though these limitations are strictly observed, it is very difficult to construct an efficient gas heat exchanger, absorber and evaporator when no means are provided for positively circulating the inert gas.

It is therefore an object of this invention to provide means for positively circulating the pressure equalizing medium in an absorption refrigeration apparatus which is very simple in construction and operation, and which requires a modicum of energy to operate.

More particularly it is an object of the present invention to provide electromagnet means wholly outside of a hermetically sealed system such as an absorption refrigeration system, so that the defects mentioned above may be overcome, and at the same time cause movement of a flexible part of the sealed system to cause relative movement between a driving element and a fluid to cause circulation of the fluid.

It is still another object of the invention to provide an electromagnetic gas circulator in which an electromagnet causes vibration of a portion of a hermetically sealed system which in turn causes vibratory movement of a flexible fluid driving element inside of the system.

It is still another object of the invention to provide an electromagnetic means for vibrating a pipe to drive a gas within the pipe, the gas being driven due to the shape of means within the pipe.

Another object of the invention is the provision of means for circulating the inert gas independently of the temperature conditions within an absorption refrigeration apparatus.

Other objects and advantages reside in novel features of the arrangement and construction of parts, as will be apparent from the following description taken in connection with the accompanying drawing, in which:

Figure 1 is a diagrammatic representation of a continuous absorption refrigerating system in which inert gas is employed and in which one embodiment of the invention is shown incorporated;

Figure 2 is an enlarged fragmentary view of the gas driving means of the arrangement of figure 1, a portion of the device being cut away to show the internal construction;

Figure 3 is an enlarged view in elevation of another embodiment of the invention, a portion of the figure being cut away to show the internal construction and the arrangement being suitable for use in place of the gas circulating means shown in Figure 2 in an arrangement similar to that of Figure 1;

Figure 4 is a fragmentary vertical cross-sectional view of a U-shaped pipe in which still another embodiment of the invention is incorporated;

Figure 5 is a horizontal cross-sectional view of one leg of the U-shaped conduit of the arrangement of Figure 4, the view being taken on the line 5—5 of Figure 4;

Figure 6 is a fragmentary vertical cross-sectional view of still another embodiment of the invention; and Figure 7 is a horizontal cross-sectional view of the arrangement of Figure 6.

Referring to the drawing in detail and first to the apparatus diagrammatically illustrated in Figure 1, it will be seen that an absorption refrigerating system is shown as consisting of a boiler B, a gas separation chamber S, an absorber A, an evaporator E and a condenser C, these parts being connected by various conduits as shown to form the complete refrigerating system. The boiler B may have a dome 11 to which a vertically extending pipe 12 is connected, this pipe acting as a gas lift pump in accordance with known construction to convey liquid and gas into the gas separation chamber S. The gas separation chamber S may have a vertical pipe 13 integral pipe 13 integral therewith which acts as a rectifier and the top of this pipe is connected to a gas conduit 14 which leads to the top of the condenser C. The lower portion of the condenser C is connected by means of the conduit 15 to the top of the evaporator, so that the refrigerant vapor which changes to a liquid in the condenser C may flow into the evaporator and there evaporate to produce a cooling effect.

For conveying absorption liquid in a cycle between the boiler B and the absorber A, a liquid conduit 16 is connected to the gas separation chamber S and to the top of the absorber A while a second conduit 17 is connected to the bottom of the absorber A and the bottom of the boiler B. The liquid conduits 16 and 17 may be in heat exchange relation as illustrated. With these connections, the liquid which is pumped from the level of the boiler B up into the gas separation chamber by the gas lift pump 12, flows by gravity from the conduit 16 into the absorber and after trickling downwardly over baffle plates in the absorber, flows back to the boiler B through the conduit 17 also under the influence of gravity.

For circulating an inert gas such as hydrogen or air between the evaporator and the absorber two inert gas conduits are provided as diagrammatically illustrated at 18 and 19 in Figure 1. In this arrangement the top of the absorber is connected to the bottom of the evaporator by the conduit 18 while the top of the evaporator is connected to the bottom of the absorber by the conduit 19. These two conduits may be in heat exchange relation as illustrated, it being understood that this illustration is purely diagrammatic and that in actual construction any known type of gas heat exchanger might be employed.

In accordance with the present invention, power driven means is employed for circulating the inert gas between the evaporator and the absorber. This power driven means may be located in either conduit 18 or conduit 19 or in the evaporator or the absorber. In other words the power driven gas circulator may be located in any part of the inert gas system. For convenience in illustrating in Figure 1 the conduit 19 has been selected for the location of the power driven gas circulating means and the casing for this device in Figure 1 has been marked with the numeral 21.

The details of the gas circulator diagrammatically illustrated in the conduit 19 of Figure 1 will be more apparent from a study of the arrangement illustrated in Figure 2. It is well known that in refrigerating systems of the type illustrated in Figure 1, the evaporator is often located a considerable distance above the absorber. In accordance with the present invention, the gas circulating device is located in a part of the inert gas circuit whch can be vibrated or suddenly displaced to some extent. If the evaporator is located a considerable distance above the absorber a portion of a vertically extending conduit such as the conduit 19 of Figure 1 may be vibrated or suddenly displaced slightly, even though the upper and lower portions of this conduit are secured to a rigid frame portions of which are shown in cross section in Figure 1 at 22. In a household refrigerating unit of normal size, the distance between the two rigid supports 22 in Figure 1 might be as much as two or three feet, and due to the slight resiliency of the conduit 19, the portion of this conduit between the supports might be vibrated back and forth a small distance by a vibrating device such as the electromagnet 23.

As illustrated in Figures 1 and 2, an electromagnet has its core 23 rigidly secured to some supporting frame structure 25, the core being mounted adjacent an armature 26 secured to a part of the conduit 19. With this construction the entire pipe section between the to supports 22 may be vibrated back and forth slightly by the electromagnet. This construction is intended to broadly illustrate a form of electric vibrator. Any known equivalent structure such as a cam driven by an electric motor, might be used to vibrate the pipe 19 at any desired frequency, or to cause a sudden slight displacement of pipe 19. In any case, however, it will be apparent that all of the electrical and magnet circuits of the vibrator are on the exterior of the refrigerating system and accordingly, it is unnecessary to pass either electric currents or magnetic flux through the walls of the refrigerating system.

For causing movement of gases within the conduit 19 in response to the slight movement imparted to it by the vibrator, various devices may be employed. In the arrangement of Figure 2 a small flexible vibrating fin or blade 27 is used for this purpose, this fin being mounted on a supporting structure 28 and carrying a gas propelling device 29 at its upper end which may aid the fin in driving the gas. A bob-weight 30 may be adjustably positioned on the fin 27. The section of the pipe 19 adjacent the fin is enlarged as shown at 21 to take care of the motion of the fin 27 and the members mounted thereon. With this construction the fin may be vibrated back and forth with a much larger amplitude than that imparted to the section of the pipe 19 by the electromagnetic means. The bob-weight may be adjusted by moving it toward or away from the fixed end of the fin 27 until the proper degree of amplitude is obtained either at the same or a different frequency from that of the motion of the pipe 19. In mass production, or if desired in constructing a single unit the weight 30 may be eliminated all together if the member 29 has the proper weight to maintain a predetermined amplitude of vibration of the fin 27. The circulation of the inert gas in response to movement of the fin 27 may be the same or similar to that described in the co-pending application of George Daiger, Serial No. 21,920, filed May 17, 1935. Movement of the fin or blade 27 back and forth causes gas to flow upwardly through the chamber provided by the casing 21. The movement of the gas may be partly due to the shape of the casing 21 but it is probably due primarily to the vibration of the blade and to the fact that the lower portion of the blade moves less distance than the upper portion thereof, and, as stated above the movement of the gas may be increased by the member 29. This element 29 may consist of a small section of the wall of the cylinder, mounted with its axis at right angles to the movement of the blade 27.

As mentioned above, the arrangement of Figures 1 and 2 is particularly designed for circulating inert gas in an absorption refrigerating system in which the evaporator is located a suitable distance above the absorber or in some construction where a long piece of vertically extending pipe is present. If the evaporator and the absorber are located closer together or where no long portion of pipe is provided an arrangement like that in Figure 3 may be employed for circulating inert gas, it being understood that the arrangement of Figure 3 may be connected into any portion of the inert gas circuit of the absorption refrigerating system at a convenient place, as for example between the lower and upper portions of the conduit 19 of Figure 1, if care is exercised that no liquid traps are formed.

In Figure 3 a gas pump is shown as connected between an inlet conduit 31 and a discharge or outlet conduit 32. Between these two conduits an enlarged chamber is provided by means of a pump casing 33 which has a baffle plate 34 therein through which a long nozzle 35 extends and which is located just below a short nozzle 36. The baffle 34 has an opening or hole 37 therein below the short nozzle 36. The two nozzles 35 and 36 are connected on the opposite sides of a diaphragm 38 in a diaphragm casing 39. The diaphragm 38 may carry a bob-weight or similar device such as is illustrated at 40.

The two pipes 31 and 32 may be so bent as to have their lower portions brought into a single plane at right angles to the plane of the paper, as viewed in Figure 3, and when so constructed the upper portions of the pipes 31 and 32 as well as the pump casing 33 and the diaphragm casing 39 may all be vibrated as a unit in a direction in the plane of the paper by suitable electromagnet means such as is illustrated at the upper end of the diaphragm casing 39. This electromagnetic means may be the same as that of the arrangement of Figure 2 and the similar reference characters are used, the electromagnet thus being shown at 23 and the armature at 26, the core of the electromagnet being supported on a portion of the frame 25. When the entire pump assembly as viewed in Figure 3 is vibrated back and forth, the bob-weight 40 on the diaphragm 38 is caused to vibrate within the diaphragm chamber 39. As it moves back and forth it changes the volume of the parts of the chamber on the opposite sides of the diaphragm.

As viewed in Figure 3, as the volume in the left hand chamber in the casing 39 becomes smaller due to movement of the diaphragm to the left, air is expelled from the nozzle 36 with a jet effect. This causes the inert gas to pass through the opening 37 in the baffle plate 34. Likewise, when the volume in the part on the right of the diaphragm is decreased, gas is expelled through the nozzle 35 with a jet effect so that the inert gas in the pump casing 33 is further directed downwardly. As the volume in either of the chambers on the two sides of the diaphragm in the casing 39 increases, on the other hand, air is sucked in through one or the other of the nozzles 35 or 36, but as the air enters these nozzles it comes in from a direction more or less at right angles to the direction of the jet expelled therefrom so that the movement of air into the casing 39 has little or no effect upon the movement of gas in the pump chamber 33.

The action of the nozzle and the diaphragm in promoting circulation of the inert gas may be the same as that described in the co-pending application of R. S. Nelson et al. Ser. No. 25,732 filed June 10, 1935, the novelty in the present construction residing in the means and method for causing movement of the diaphragm 38 within the casing 39 and in the mounting of the arrangement so that the entire assembly may be vibrated to impart movement to the diaphragm.

In both of the arrangements of Figures 2 and 3 movable elements are shown on the interior of a hermetically sealed refrigerating system and movement is imparted to these elements by moving a portion of the refrigerating system. Various other movable elements could be employed for the same purpose and the arrangements of Figures 2 and 3 are intended to illustrate only one way of accomplishing the desired result. It should also be noted that a fin like that shown in Figure 2 might be used in an arrangement of pipes like that of Figure 3 and is not limited to use in a long pipe or a vertical one.

Since any movable element in time becomes worn and gives way it is within the purview of the present invention to provide an arrangement in which there are no elements inside of the sealed system which move relative to the walls of a part in which they are located. It is possible to cause a gas or other fluid to move through a conduit by merely imparting vibratory movement to the conduit, provided the internal construction of the conduit is such that a directional movement is imparted to the fluid therein. In the arrangements of Figures 4 to 7 two embodiments of the invention are disclosed which are arranged to operate in this way. In each of these arrangements, an electro-magnet for vibrating a pipe, like that described above, has been illustrated.

In the arrangement of Figures 4 and 5 a U-shaped conduit 41 similar to that in Figure 3 may be employed. The vibrating means may be mounted near the upper end of the conduit 41 to impart vibratory movement thereto. Only one leg of an inverted U-shaped conduit 41 is shown in Figures 4 and 5, it being understood that the other leg may be similar except that the gas driving means is inverted. As shown in Figures 4 and 5, the pipe 41 is provided with gas circulator blades 42 and 43 arranged in staggered relation therein, those on the left side of the pipe, as viewed in these figures being marked 42, and those on the right 43. These circulators may be identical in construction and may be provided with tabs 44 on the upper ends thereof for securing them in the pipe 41 in spaced relation.

Each of the gas circulator blades 42 and 43 has a horizontal lower surface and a curved upper surface conforming to the curvature of the blade of an ordinary revolving fan. This arrangement operates to move a gas upwardly through the pipe 41 as it is vibrated back and forth by the electro-magnetic means shown in the top of Figure 4. As the upper end of the pipe 41 is forcibly moved to the right, as viewed in Figure 4, the gas is propelled upwardly by the curved surfaces on the blades 42. As the pipe 41 is forcibly moved to the left, the curved surfaces on the blades 43 propel the gas upwardly. As the blades return to their starting position, the gas is churned somewhat but no appreciable directional movement is imparted to the gas in either direction. Thus as the conduit 41 moves back and forth fluid therein is caused to pass upwardly therethrough. The other leg of the inverted U-shaped conduit which in the arrangement of Figure 4 is located directly behind the leg 41 may have blades therein similar to those shown at 42 and 43, but in an inverted relation so that fluid is caused to pass upwardly through the leg shown and downwardly through the other leg of the inverted U-shaped conduit 41 as this conduit is moved back and forth.

Another arrangement for causing movement of a fluid in a conduit when the conduit is vibrated is shown in Figure 6, in which the view is taken in vertical cross-section and in Figure 7 in which a horizontal cross-section of the arrangement of Figure 6 is illustrated. In this arrangement the electro-magnetic means causes vibration of the pipe 45 as in the arrangement of Figure 2. Carried on a vertically extending rod 46 mounted in the pipe 45 by suitable brace rods 47 are a number of fluid actuators 48. These are rectangular in shape as shown in Figure 7 at 48 and are flat on their top sides, as shown in Figure 6, and curved on their lower sides. The bottom surface of each of the fluid actuators 48 is in reality two curved blades placed adjacent each other. As viewed from the bottom in the arrangement of Figure 6 the outer portions, or those to the left and right have concave surfaces while the central portion is convex. As the pipe 45 and these blades are moved to the right, the righthand portion of each blade 48 causes a downward movement of the fluid in the pipe. As the fluid actuators move to the left, the lefthand portion causes downward movement of the fluid in the conduit 45. As the actuator moves to the right, the lefthand portion has little effect upon movement of the fluid and as it moves to the left the righthand portion has little effect. By proper design, the driving effect of the actuators may be increased and their resistance to movement through the fluid reduced.

Various arrangements other than those illustrated may be used to cause movement of a fluid and in its broader aspects the invention is not limited to any particular arrangement. It is within the purview of the invention to impart tortional rather than translatory vibrational movement to a portion of a pipe or conduit to cause relative movement of a fluid actuator and the fluid therein to impart motion to the fluid.

While the invention has been shown and described in connection with the inert gas circuit of an absorption refrigerating system, it is obvious that the same principles could be used in driving any gas or liquid in any hermetically sealed system.

Various changes in the arrangement and construction of parts may be made without departing from the spirit of the invention or the scope of the annexed claims.

I claim:

1. In a hermetically sealed system having a fluid therein, an arrangement for imparting motion to the fluid comprising electro-magnetic means for imparting vibratory movement to a part of said system and means within said part adapted to pass through the fluid with a vibratory motion as a result of the vibratory movement imparted to said part by said electro-magnetic means to impart directional movement to the fluid.

2. In a hermetically sealed system having a fluid therein, an arrangement for imparting motion to the fluid comprising electro-magnetic means for imparting vibratory movement to a part of said system and a resilient blade mounted for vibratory movement within said part, the arrangement being such that vibratory movement of said part by said electro-magnetic means causes vibratory movement of said blade in contact with the fluid to drive the fluid.

3. In a hermetically sealed system having a fluid therein, an arrangement for imparting motion to the fluid comprising electro-magnetic means for imparting vibratory movement to a part of said system and a resilient diaphragm mounted for vibratory movement within said part, the arrangement being such that vibratory movement of said part by said electro-magnetic means causes vibratory movement of said diaphragm which in turn is utilized to impart directional movement to the fluid.

4. In a hermetically sealed system, a pumping device for circulating a fluid therein, said pumping device including a casing connected in said system, electro-magnetic means for imparting vibratory movement to that portion of the system containing said casing and means within said casing operable to move in the fluid to be driven in response to movement of said casing, the arrangement being such that movement of the means within the casing is utilized to impart directional movement to the fluid.

5. In a hermetically sealed system having a fluid therein, an arrangement for imparting motion to the fluid comprising electro-magnetic means for imparting vibratory movement to a part of said system and a fluid propelling means fixed within said part for movement therewith, said fluid propelling means being so constructed as to impart a directional movement to the fluid in said part as the result of the motion imparted thereto by said electro-magnetic means.

6. A fluid conveying means having an element in the path of the fluid positioned to cause movement of a fluid along the conveyor when suddenly displaced, and means adjacent said conveying means operable to suddenly displace a portion thereof adjacent said element in a direction transverse to the direction of fluid flow.

7. A fluid conveying means having an element in the path of the fluid positioned to cause movement of a fluid along the conveyor when suddenly displaced, and electro-magnetic means operable to suddenly displace a portion of said conveyor adjacent said element.

8. A fluid conveying means having an element in the path of the fluid positioned to cause movement of a fluid along the conveyor when the same is vibrated, and means adjacent the position of said element operable to vibrate said conveyor in a direction transverse to the direction of fluid flow.

9. A fluid conveying means having an element in the path of the fluid positioned to cause movement of a fluid along the conveyor when the same is vibrated, and electro-magnetic means operable to vibrate said conveyor.

10. A fluid pump comprising a casing having an inlet and an outlet, an element mounted within the fluid passage, and means adjacent the position of said element in the casing operable to suddenly displace said casing in a direction transverse to the direction of fluid flow whereby said element causes uni-directional fluid flow along said passage.

11. A fluid pump comprising a casing having an inlet and an outlet, an element mounted in the fluid passage within the casing, and electro-magnetic means positioned to suddenly displace said casing whereby said element causes uni-directional fluid flow along said passage.

12. A hermetically sealed absorption refrigerating system including an evaporator, an absorber and conduits connecting the evaporator and absorber in circuit to provide a path for an inert gas, at least a portion of said system enclosing a part of the inert gas path being shaped to cause uni-directional flow of said inert gas therethrough in response to vibration thereof.

13. A hermetically sealed absorption refrigerating system comprising an evaporator, an absorber and conduits connecting the evaporator and absorber in circuit to provide a path for an inert gas, a portion of said system enclosing a part of the inert gas path being shaped to cause uni-directional flow of said inert gas therethrough in response to vibration thereof and means external to said gas circuit to vibrate said portion of said system.

14. A hermetically sealed absorption refrigerating system comprising an evaporator, an absorber and conduits connecting the evaporator and absorber in circuit to provide a path for an inert gas, a portion of said system enclosing a part of the inert gas path being shaped to cause uni-directional flow of said inert gas therethrough in response to vibration thereof, and electro-magnetic means external to said gas circuit to vibrate said portion of said system.

15. A hermetically sealed absorption refrigerating system comprising an evaporator, an absorber and conduits connecting the evaporator and absorber in circuit to provide a path for an inert gas, and means enclosing a part of the gas path forming said circuit and operable to produce uni-directional flow of inert gas therealong in response to a sudden displacement thereof.

16. A hermetically sealed absorption refrigerating system comprising an evaporator, an absorber and conduits connecting the evaporator and absorber in circuit to provide a path for an inert gas, means constituting a part of said circuit and operable to produce uni-directional flow of inert gas therealong in response to a sudden displacement thereof and electro-magnetic means external to said gas circuit operable to suddenly displace said part.

17. A hermetically sealed absorption refrigerating system comprising an evaporator, an absorber and conduits connecting the evaporator and absorber in circuit to provide a path for an inert gas, means enclosing a part of the gas path forming said circuit and operable to produce uni-directional flow of inert gas therealong in response to a sudden displacement thereof, and means associated with said part of said gas circuit and operable to periodically suddenly displace said part.

18. In an absorption refrigerating system, a fluid circulator having an element in the path of the fluid positioned to cause uni-directional movement of the fluid therethrough when said circulator is suddenly displaced, and means positioned adjacent said fluid circulator operable to intermittently suddenly displace said circulator.

19. A fluid pump, comprising conduit means for conveying fluid, fluid propelling means disposed within and immovable with respect to said conduit means and operable when vibrated to impel the fluid in said conduit means, and means for imparting vibratory movement transversely to the axis of said conduit and said fluid propelling means.

20. A fluid pump, comprising conduit means for conveying fluid, fluid propelling means including a vibratory element disposed in and supported by said conduit means to provide separate chambers in said conduit means and operable when vibrated to impel movement of the fluid from said chambers through the remaining conduit means, and means for vibrating said conduit means in a direction crosswise of the axis thereof and thus said fluid impelling means.

21. A fluid pump, comprising conduit means for conveying fluid, fluid propelling means including a plurality of superimposed elements disposed in said conduit means and operable when vibrated to impel the fluid in said conduit means, and means for vibrating said fluid propelling means at an angle to the longitudinal axis of said conduit means.

22. In a hermetically sealed absorption refrigerating system having an evaporator, an absorber and conduit connecting the evaporator and the absorber to form a circuit therewith for the flow of an inert gas, a gas circulator having an inlet and an outlet and operable to drive a fluid from said inlet to said outlet, said circulator comprising an element in contact with and in the path of the fluid and operable to impart directional movement thereto from the inlet toward said outlet in response to a sudden displacement of said circulator, and electro-magnetic means positioned to suddenly displace said circulator.

23. In a hermetically sealed system having a fluid therein, an arrangement for imparting motion to the fluid comprising electro-magnetic means for moving a part of said system and mechanical means secured to and located within said part for contacting said fluid to impart a directional movement thereto in response to the movement imparted to said part by said electro-magnetic means.

EARL BABCOCK.